United States Patent
Gordon et al.

[15] 3,664,327
[45] May 23, 1972

[54] MAGNETIC PROBE

[72] Inventors: Reuben H. Gordon, Holly Hill Plaza, 2321 Peach Orchard Road, Augusta, Ga. 30906; Ivan H. Brown, 304 Bloomfield Road, Sebastopol, Calif. 95472

[22] Filed: Nov. 27, 1970

[21] Appl. No.: 93,264

Related U.S. Application Data

[63] Continuation-in-part of Ser. No. 845,184, July 28, 1969, abandoned.

[52] U.S. Cl. .............................................. 128/1.4, 335/297
[51] Int. Cl. ........................................................ A61b 17/52
[58] Field of Search .................................. 128/1.3–1.5, 341, 128/343; 335/209, 297

[56] References Cited

UNITED STATES PATENTS

| 1,216,183 | 2/1917 | Swingle ................................. 128/1.5 |
| 2,436,538 | 2/1948 | Wing .................................... 128/1.4 |
| 3,101,463 | 8/1963 | Penningroth ........................... 336/87 |

*Primary Examiner*—L. W. Trapp
*Attorney*—Lawrence I. Field

[57] ABSTRACT

A case made of non-magnetic material encloses a paramagnetic core leaving a key hole slotted end closely spaced from an opening in the case at a rounded probe end. An electromagnetic winding is mounted about the core axially spaced from the slotted end to establish a magnetic field of maximum intensity at the probe end of the case.

8 Claims, 3 Drawing Figures

PATENTED MAY 23 1972    3,664,327

REUBEN H. GORDON
IVAN H. BROWN
INVENTORS

BY Lawrence J. Field
ATTORNEY

MAGNETIC PROBE

This invention relates to magnetic probe devices and is a continuation-in-part of our prior co-pending abandoned application, U.S. Ser. No. 845,184 filed July 28, 1969.

Electromagnetic devices for establishing a magnetic field at a desired location for various purposes are well known. The housing, core and winding structure associated with such devices are designed to meet specific requirements dictated by the purpose or use. It is, therefore, an important object of the present invention to provide a magnetic probe device expressly designed for establishing a controlled and localized magnetic field at relatively inaccessible locations, including but not necessarily limited to body cavities of animals for treatment of muscle tissue.

In accordance with the present invention, a tubular casing of non-magnetic material encloses a solenoid core and through an opening at a rounded end of the casing, one end of the core is exposed. A solenoid winding is mounted about the core within the casing to generate magnetic field when energized from a dc source of voltage, such as disclosed in U.S. Pat. No. 2,897,411. Magnetic flux is emitted through the opening of the casing at the rounded end from a poleface end of the core having a keyhole slot formation. As a result of the foregoing arrangement, it has been found that a magnetic field of greater intensity is established at the rounded end of the probe device than at the unexposed end.

Figure 1:
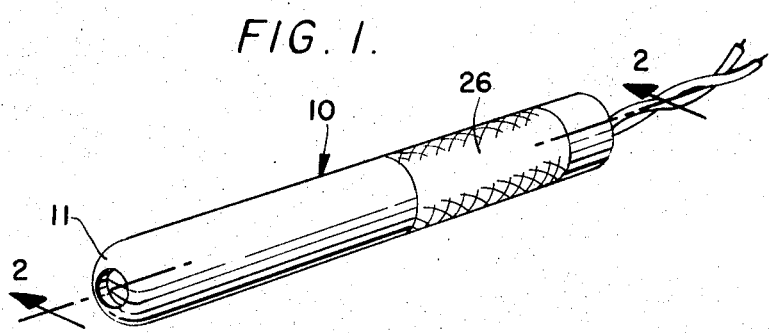
FIG. 1 is a perspective view of the probe device.
Figure 2:
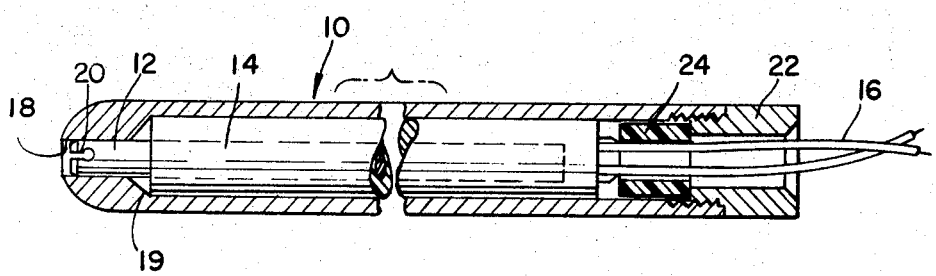
FIG. 2 is an enlarged sectional view taken substantially through a plane indicated by section line 2—2 in FIG. 1.

Referring now to the drawing in detail, a tubular case 10 is provided with a rounded probe end 11. Enclosed within the case is a paramagnetic core 12 and a solenoid winding 14, the leads 16 of which are attached to a reversible DC power source 17. The solenoid winding preferably comprises about 24,000 turns of No. 39 wire and the case 10 is made of a non-magnetic material such as chromed brass.

The case is provided with a concentric bore to form an opening 18 at the rounded probe end. The bore adjacent the opening 18 is of a diameter sufficient to accommodate one end portion of the core 12. The diameter of the bore is enlarged at a location axially spaced from the end 11 to accommodate the solenoid winding 14 into which the core projects. The winding 14 is held axially assembled between the shoulder 19 of the bore and a screw cap 22 closing the rear end of the case by a non-magnetic spacer 24. Electrical leads 16 extend from the winding through the spacer and screw cap. The case is also provided with an externally knurled grip portion 26 at the rear end.

Figure 3:
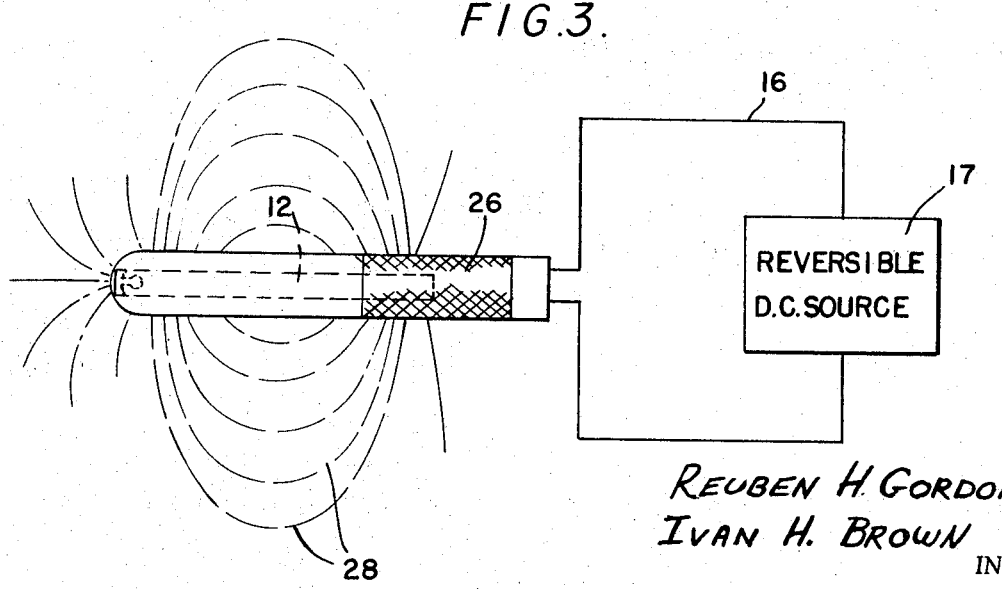
FIG. 3 is a diagrammatic view of the probe device when energized.

The end of the core exposed through opening 18 has a keyhole slot formation. Because of this formation, the projection of the core from one axial end of the winding and exposure thereof through an opening in a non-magnetic case, the magnetic field as depicted by the flux lines 28 in FIG. 3 is more intense at the probe end than the unexposed end. Accordingly, with the same voltage magnitude, a greater attractive magnetic force is established at the probe end than repulsive force. The polarity of the pole face formation 20 is, of course, controlled through the reversible DC source 17.

The end 11 of the case is rounded to facilitate insertion into body cavities of animals and other relatively inaccessible locations. In this manner, treatment of muscle tissue by application of a magnetic field is made possible in a controlled manner. With a positive pole established at the probe end, it is possible to cause relaxation of muscle tissue while muscle contraction may be brought about by establishment of a negative pole at the probe end. In either case, it will be apparent that the magnetic field will be more intense at the probe end than at the opposite end of the core within the winding, in view of the non-magnetic case enclosure.

Modification and variations of the invention hereinbefore set forth may be made without departure from the spirit and scope thereof and, therefore, only such limitations should be imposed as are indicated in the appended claims.

We claim:

1. A magnetic probe adapted to be inserted into body cavities for treatment of muscle tissue, comprising an elongated casing made of non-magnetic material having a rounded probe end and a longitudinal bore forming an opening at said probe end, a magnetic core mounted within said bore having opposite ends, one of said ends being closely spaced from the opening within the casing, and electromagnetic winding means mounted on the core in spaced relation to said one of the ends for establishing a magnetic field of greater intensity of said one of the ends, said one of the ends having a formation favoring establishment of the magnetic field at the probe end of the casing of a greater intensity with respect to one end.

2. The combination of claim 1 wherein said one polarity is positive.

3. The combination of claim 2 wherein said formation is a key-hole slot.

4. The combination of claim 3 wherein the magnetic field of positive polarity at the probe end is adapted to cause relaxation of muscle tissue, while negative polarity causes contraction.

5. The combination of claim 2 wherein the magnetic field of positive polarity at the probe end is adapted to cause relaxation of muscle tissue, while negative polarity causes contraction.

6. The combination of claim 1 wherein said formation is a key-hole slot.

7. A magnetic probe for medical use comprising a tubular case made of non-magnetic material having an open magnetic flux emitting end, a core mounted within the case having a key-hole slotted face closely spaced from said open end of the case and a solenoid winding mounted about the core in axially spaced relation to said pole face of the core.

8. The combination of claim 7 wherein said flux emitting end of the case is rounded and provided with an opening through which the pole face of the core is exposed.

* * * * *